Figure 1:
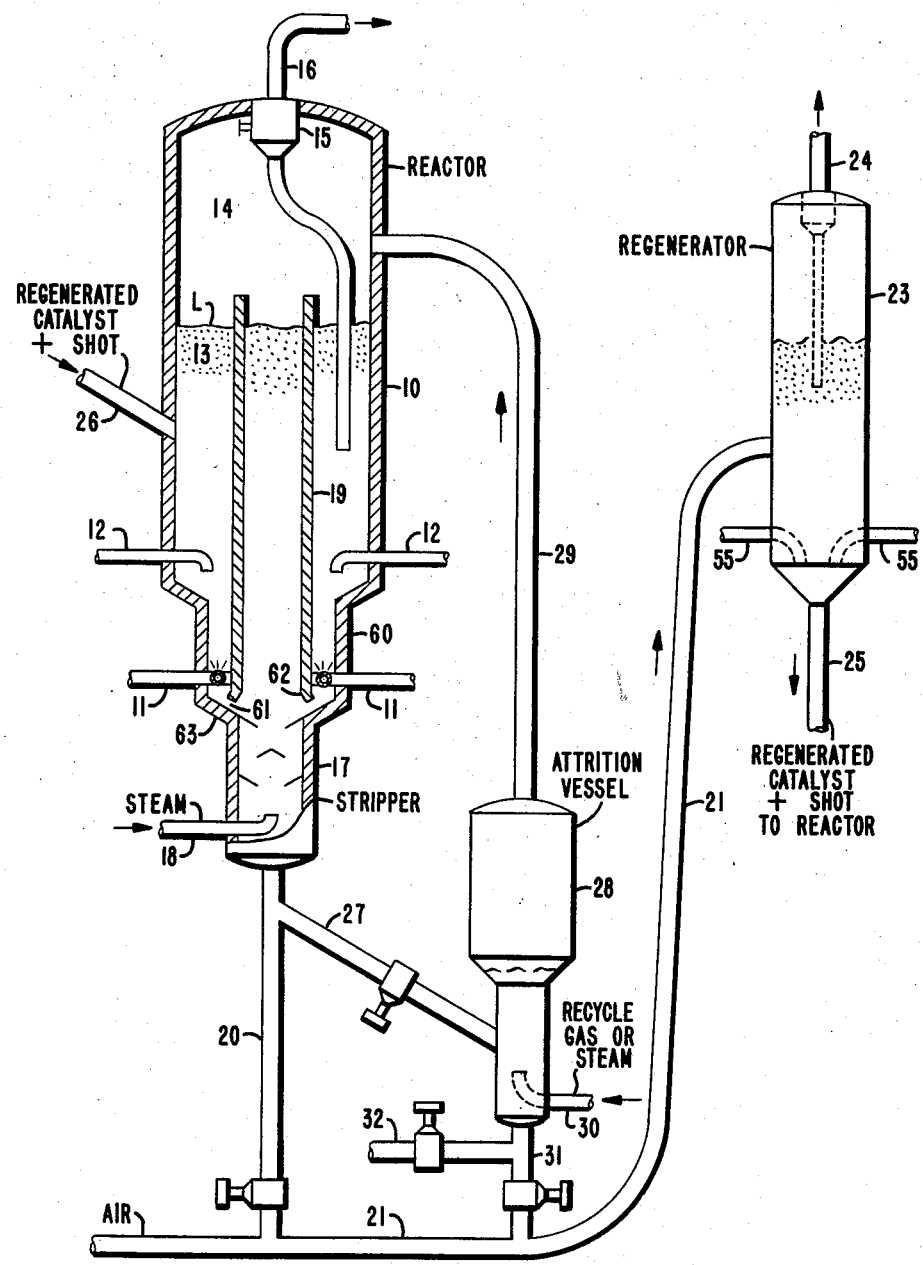

June 2, 1959

E. W. S. NICHOLSON 2,889,269

REMOVAL OF ADHERED CATALYST FROM INERT SHOT IN A
FLUIDIZED SOLIDS CATALYTIC PROCESS

Filed Dec. 30, 1954

2 Sheets-Sheet 1

EDWARD W. S. NICHOLSON  INVENTOR

BY *H. M. Feyrer*  ATTORNEY

EDWARD W. S. NICHOLSON INVENTOR

ATTORNEY

United States Patent Office 2,889,269
Patented June 2, 1959

2,889,269

REMOVAL OF ADHERED CATALYST FROM INERT SHOT IN A FLUIDIZED SOLIDS CATALYTIC PROCESS

Edward Wheelock Steele Nicholson, Baton Rouge, La., assignor to Esso Research and Engineering Company, a corporation of Delaware Application December 30, 1954, Serial No. 478,708

5 Claims. (Cl. 208—149)

This invention pertains to fluid catalytic processes and particularly to fluid catalytic processes in which inert heat transfer solids or shot are circulated in the system in order to facilitate the removal of heat from an exothermic reaction zone or the supply of heat to an endothermic reaction zone or both.

The fluidized solids technique has been widely adopted for a variety of catalytic reactions especially for the conversion of hydrocarbons as in catalytic cracking, reforming, hydroforming and the like because of the advantages offered thereby of continuity of operation, uniformity of temperatures in the reaction and regeneration zones and the facility with which control of all phases of the process is achieved. An important advantage of the fluid solids technique is the fact that the catalyst can be used as a carrier of heat from the regeneration zone into the reaction zone.

It has been proposed to increase heat transfer in fluid catalytic processes by circulating inert heat transfer solids through the system along with the catalyst. This is especially useful in fluid hydroforming since selectivity considerations require that low catalyst-to-oil ratios, generally less than 3.5 to 1 be used. Such low catalyst-to-oil ratios limit the amount of heat that can be safely transferred from the regeneration zone to the reaction zone as sensible heat in the catalyst. Since the amount of heat released in the regenerator is so much greater than the catalyst is capable of carrying back to the reactor at permissible temperatures, it is common practice to arrange cooling coils in the regenerator. This, therefore, necessitates preheating the naphtha and recycle gas to such temperatures as tend to cause thermal degradation of naphtha feed as well as of the higher molecular weight constituents of the recycle gas. By circulating inert heat transfer solids along with the catalyst it is possible to eliminate the cooling coils in the regenerator and also reduce the amount of recycle gas circulated and still achieve a heat balanced operation.

In view of the fact that the inert heat transfer solids occupy valuable reactor space, i.e., each volume of shot displaces an equal volume of catalyst from the reaction zone, several systems have been devised which in essence involve the circulation of the shot through the reaction zone at a substantially faster rate than the catalyst. In this way, the total volume of shot in the reactor at any given moment can be kept fairly low, say of the order of about one part of shot to about eight to ten parts of catalyst while at the same time shot and catalyst are withdrawn either separately or together for circulation to the regenerator or heating zone in ratios of from about three or four parts of shot to one of catalyst to as high as eight or ten parts of shot to one of catalyst.

It has been found, when circulating shot or inert, fluidizable heat transfer solid particles such as mullite along with a molybdenum oxide on alumina catalyst in a fluid hydroforming reactor system, that fine particles of catalyst tend to adhere to the shot. In one operation, for example, this catalyst layer built up to 5 to 10% of catalyst on the shot. This, of course, essentially defeats the purpose of the shot since the shot carrying such a catalyst layer is no longer an inert material but is in fact a catalyst. This disrupts the reactor system since circulation of the shot carrying a catalyst layer thereon at the rapid rates normally employed (ten to twenty times faster than the catalyst) in effect increases the catalyst to oil ratios with the attendant disadvantages of high carbon formation and low selectivity to desired products. Moreover, in running a high sulfur feed in such a system further difficulty is encountered in that the residence time of the shot containing a catalyst layer in the regeneration zone is insufficient to remove sulfur compounds, causing a serious loss in activity.

It is the object of this invention to provide an improved fluid catalytic reactor system employing shot for improving heat transfer in the system.

It is also the object of this invention to provide a fluid catalytic hydroforming system employing shot to improve heat transfer which will avoid the accumulation of substantial layers of catalyst upon the shot or inert heat transfer solids.

These and other objects will appear more clearly from the detailed specification and claims which follow.

In accordance with the present invention, the accumulation of layers of catalyst upon the inert, heat transfer solids is prevented by withdrawing a separate stream of shot or heat transfer particles from which nonadhering catalyst particles have been removed by elutriation and subjecting those shot particles to attrition conditions to break off and remove from the system any catalyst fines adhering to the shot. The attrition may be accomplished through the use of a high velocity gas jet or other known means. This attrition may be carried out on the main circulating shot stream or on a separate stream withdrawn from one of the vessels and returned to the system.

Figure 2:
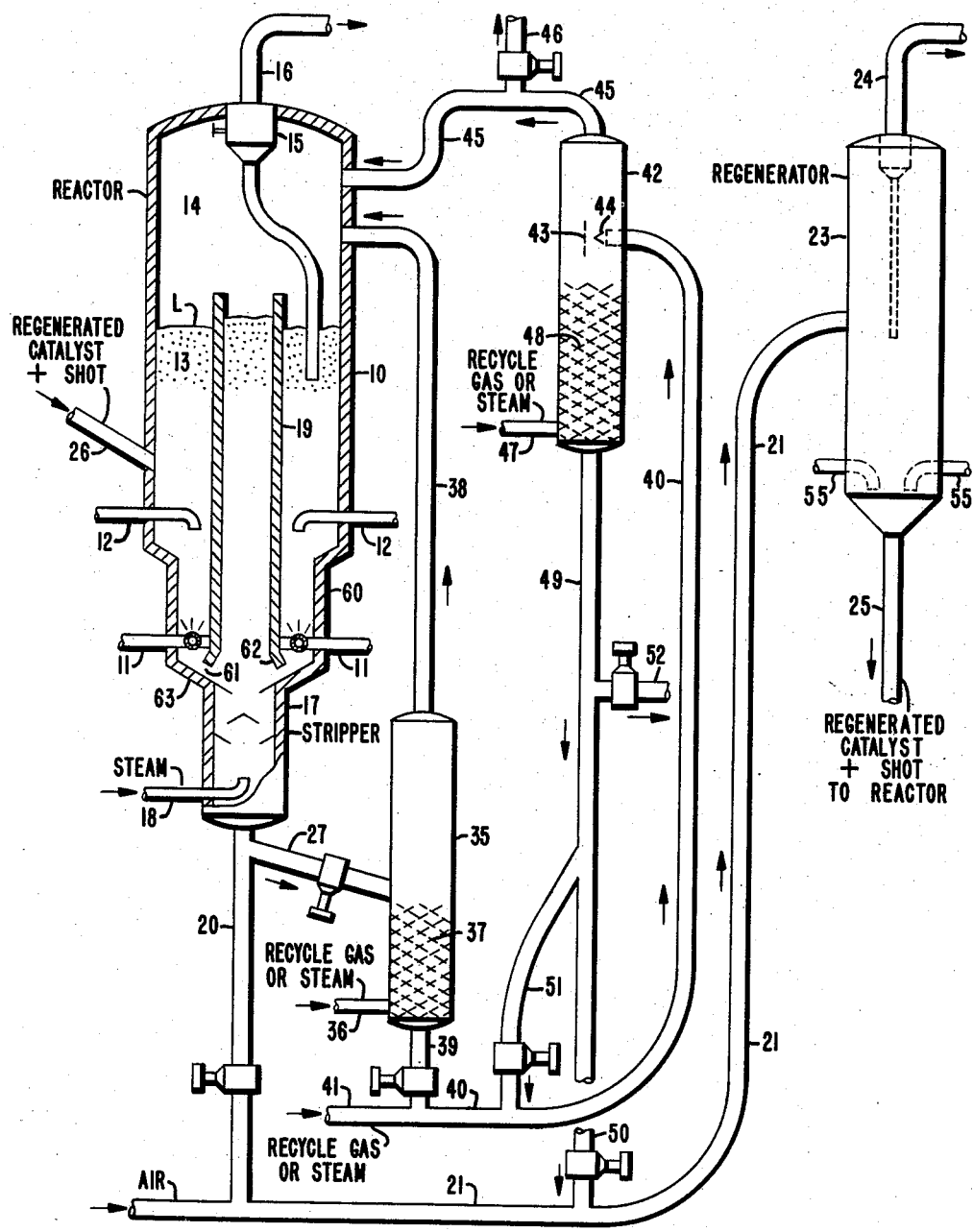

Reference is made to the accompanying drawing in which Fig. 1 illustrates, diagrammatically, one system for eliminating surface coatings of catalyst from the circulating shot and Fig. 2 illustrates a similar system in which the catalyst layer is removed from the shot particles by impinging them against a target.

Referring to Fig. 1, the reactor vessel 10 is charged with a mixture of finely divided catalyst particles and inert heat transfer solids or shot. Recycle gas is supplied to the lower part of the reactor vessel 10 partly through inlet lines 11 and partly with the preheated naphtha feed which is supplied to the reactor through inlet lines 12. Gas velocities through the reactor are controlled to form a dense, fluidized bed 13 having a definite level L or interface separating it from a dilute or disperse phase 14 comprising small amounts of catalyst entrained in the vaporous reaction products in the upper part of the vessel. The reaction products pass overhead from the reactor vessel 10 through a cyclone separator 15 or the like for separating entrained catalyst and recycling it to the reactor dense bed through the dip pipe attached to the base of the cyclone. Reaction products substantially free from catalyst or other solid particles are removed through product outlet line 16 to suitable product recovery, stabilizing and/or storage equipment.

Suitable catalysts for charging to the system are metal oxides such as molybdenum oxide, chromium oxide, tungsten oxide, vanadium oxide or the like, or mixtures thereof, preferably upon an alumina-containing support such as activated alumina, alumina gel, zinc aluminate spinel or the like. Other hydroforming catalysts such as platinum or palladium upon alumina can also be used. Cracking catalysts that may be used include silica-alumina cogels, silica magnesia, silica-alumina-magnesia, and acid activated clays. The catalyst particles should, for proper fluidization, be between about 100 to 400 mesh or about 10 to 200 microns in diameter with a major proportion between about 20 and 100 microns.

The inert heat transfer solids or shot are preferably coarser and/or of greater density than the catalyst used in the process. Suitable materials include particles of metals such as stainless steel and Monel, corundum, mullite, fused alumina, fused silica or the like. It is necessary that the heat transfer solids have no adverse effect upon the hydroforming process or other catalytic reaction and that they be stable or resistant to breakdown due to the thermal and physical forces to which they are subjected in the process. The size of the heat transfer solids may vary from about 200 to 2000 microns and they are preferably about 800 to 1400 microns in diameter and also are preferably in the shape of spherical or spheroidal particles.

Because of the fact that the shot particles are larger and have a greater density than the catalyst, the shot particles settle downwardly through the reactor dense bed more rapidly than the catalyst. By swaging down the bottom of the reactor vessel to form a settling zone of reduced cross section as compared with the reactor vessel, it is possible to concentrate the shot in this region and, by proper control of the shot inventory and control of gas velocities through the settling zone, to withdraw from the settling zone a solids stream having a high ratio of shot to catalyst for circulation to the regeneration zone. Instead of a common withdrawal, it is also possible to operate the settling zone in such a way as to withdraw substantially pure shot therefrom in which event a separate outlet for catalyst is provided near the top of the reactor dense bed so that a stream of substantially pure catalyst is withdrawn therethrough. The catalyst and shot are then remixed in the desired ratio for circulation to the regenerator. It will be understood that if separate withdrawal of catalyst and shot is practiced, the withdrawal of shot for attriting to remove the catalyst layer as described below will be from the stream of shot.

In the system shown, a mixture of shot and catalyst in the ratio set by the inventory of shot in the system, is withdrawn from the reactor 10 into settler 60. Here the ratio of inert solids to catalyst in the descending inert solids-catalyst stream is increased by the action of the recycle gas stream introduced through line 11. The gas quantity and velocity are arranged to control the relative rates of settling of the inert solids and the catalyst particles within zone 60 so that the desired ratio between the inert solids and catalyst will be obtained in the total stream entering stripper 17. The gas velocity is maintained below the minimum fluidizing velocity of the inert solids particles so that essentially no upward movement or mass eddying of inert solids particles occurs. The gas quantity and velocity are then adjusted within the range below the minimum fluidizing velocity of the inert solids particles to properly retard and control the rate of settling of the catalyst particles to give the desired final ratio between the inert solids and the catalyst particles. Some further increase in inert solids-catalyst ratio may occur as the solids mixture passes through the restricted annular space 61 between the flared end 62 of concentric section 19 and the conical section 63 between vessels 60 and 17. This may be caused by the mechanical configuration permitting the heavy inert solids particles to drop to the lower inclined surface of the conical section 63 and move at a relatively higher rate than the average rate through the anular space. There may also be some elutriating action of small quantities of steam and stripping gas from stripper 17 passing through annular space 61 into settler 60. The shot-catalyst mixture is passed into stripper 17 where it is stripped with steam, introduced through line 18, to remove adsorbed and occluded hydrogen and hydrocarbons. Steam and stripped materials pass through the concentric section 19, which extends above the level L, and are released in the disperse phase 14.

The shot catalyst mixture is discharged from the bottom of stripper 17 into standpipe 20 and a major proportion of the mixture is discharged from the base of the standpipe into transfer line 21 where it is picked up by a stream of air and conveyed to regenerator 23 where inactivating carbonaceous deposits are burned off regenerating the catalyst particles and heating the catalyst and shot to regenerator temperatures. The regeneration gases, substantially free of catalysts or solid particles pass overhead through outlet line 24 to a waste gas stack, a waste heat boiler or to suitable scrubbing and storage equipment. The hot, regenerated catalyst and shot are withdrawn from the bottom of the regenerator and recycled to the reactor in conventional manner with or without contact with hydrogen or other reducing gas prior to discharge from conduit 26 into the reactor.

A small part of the shot-rich stream is withdrawn continuously or intermittently from standpipe 20 through transfer line 27 and introduced into attrition vessel 28. The lower portion of this vessel into which the shot-rich stream is discharged is rather small in diameter and is designed to subject the catalyst-coated shot to high velocity attrition conditions. Velocity in this section may be from 2 to 10 ft. per second. The upper section of this vessel is considerably larger in diameter and operates at lower velocity, say 0.5 to 2.0 ft. per second for recovery of shot. A simple cyclone may be included in this section for shot recovery, if desired. The catalyst carried with the shot into attrition vessel 28 plus the catalyst removed from the surface of the shot by attrition in vessel 28 is carried overhead through line 29 and returned to the reactor 10. The gas required for accomplishing the attrition in vessel 28 may be either recycle gas or steam. This gas is introduced through inlet line 30 into the bottom of attrition vessel 28. The gas may be introduced through one or more high velocity nozzles to provide additional attritive action at the point of introduction of the gas into the bed of shot that is formed at the bottom of the vessel. The cleaned shot is discharged from the bottom of the attrition vessel 28 into a standpipe 31 for introduction into transfer line 21 and thence into regenerator 23 for heating in admixture with the main portion of the circulating shot. Introduction of shot into and out of attrition vessel 28 may be either continuous or batchwise. The rate or proper time for withdrawal of shot through standpipe 31 may be determined by taking samples of shot through connection 32 to determine whether the catalyst has been sufficiently removed from the shot.

Another method of removing catalyst from shot is shown in Fig. 2. This method is based upon breaking off the catalyst layer from the shot by impingement of the shot against a target rather than by subjecting the catalyst to attrition in a fluid bed. The operation of the reactor and regenerator is the same as described above in connection with Figure 1 and the same reference numerals have been applied to the same parts in Fig. 2. In Fig. 2, the minor proportion of the shot-rich stream withdrawn from standpipe 20 through transfer line 27 is discharged into an elutriator vessel 35. Here the non-adhering catalyst is separated from the shot by passing upwardly through vessel 35 a stream of recycle gas or steam supplied through inlet line 36. Non fluidizable packing 37 may be arranged in the elutriator vessel 35 to enhance this separation. The elutriating gas and the separated catalyst are passed overhead from elutriator vessel 35 through line 38 back into the reactor. The shot freed from non-adhering catalyst is withdrawn from the bottom of elutriator 35 into standpipe 39 for discharge into transfer line 40 where it is picked up by a stream of recycle gas or steam supplied through line 41 and conveyed thereby through line 40 into vessel 42. Vessel 42 contains a target plate or arrangement of plates 43 against which the shot stream from transfer line 40 is impinged at high velocity by passing it through nozzle 44. Velocities used in nozzle 44 may be from 50 to 300 ft. per second. The fine catalyst adhering to the shot is broken off as a result of this impingement and is carried overhead from vessel 42 through line 45 to the reactor 10. If desired, this fine catalyst can be purged from the system through line 46. This is especially practical if steam is used as the carrying and elutriating gas in line 40 and vessel 42.

Shot, substantially freed from adhering catalyst fines, passes down through vessel 42 and is stripped free of the dislodged catalyst fines by means of steam or recycle gas which is introduced through line 47. Non-fluidizable packing 48 may be used in vessel 42 in order to improve the separation or elutriation of the separated fine catalyst. The shot is withdrawn from the bottom of vessel 42 into standpipe 49 which is connected through valve controlled section 50 for discharge of the cleaned shot into transfer line 21 for passage into the regenerator with the main stream of catalyst and shot, and to the valve controlled section 51 for discharge of the shot into transfer line 40 for recycling the shot to vessel 42 for impingement against target 42 to effect further dislodgement of adherent catalyst. Inspection of the shot to determine whether it is sufficiently clean for passage to the regenerator or whether it requires recycling to effect further cleaning may be made by withdrawing shot from standpipe 49 through line 52.

Ordinarily one pass of the shot through the cleaning system described above will be sufficient to clean up the shot. However, another way of operating the equipment shown would be on an intermittent basis as follows. A batch of shot is withdrawn from standpipe 20 through transfer line 27 into elutriator 35. This material is stripped of non-adhering catalyst and then transferred through line 40 into vessel 42 containing the impingement target 43. The shot is recycled through standpipe 49, branch line 51 and line 40 back to vessel 42 until samples withdrawn at 52 show that all the adhering catalyst has been removed. The clean shot is then returned to the circulating system by discharge through section 50 into transfer line 21 and thence into regenerator 23.

As indicated above, some reactor designs provide for separate withdrawal of a substantially pure shot stream and a substantially pure catalyst stream for subsequent recombining or remixing in the desired proportions. In the case of such reactor designs, it is unnecessary to include an elutriator vessel such as vessel 35 in the system of Fig. 2. Instead, a portion of the pure shot stream withdrawn from the reactor is discharged via suitable standpipes or the like into transfer line 40 for discharge or impingement against target 43 in vessel 42.

The shot drawn off through transfer line 27 to the cleansing systems in accordance with the present invention amounts to about 0.01 to 1.0% of the total shot stream passing through standpipe 20. The concentration of catalyst on the shot withdrawn for clean-up in accordance with this invention is about 0.5 to 5.0 wt. percent and the concentration of catalyst on the cleaned shot is about 0 to 1.0 wt. percent based on the shot.

The feed or charging stock to the reactor in a hydroforming operation may be a virgin, cracked or Fischer-Tropsch naphtha or the like and also mixtures of such naphthas having a boiling range of from about 125–450° F., or it may be a narrow-boiling cut from within this range. The feed stock is preheated to about reaction temperature and supplied to the reaction zone. Recycle gas is preheated to temperatures of up to about 1200° F. and introduced or circulated through the reaction zone at rates of from about 500 to 6000 cu. ft. per barrel of feed.

The hydroforming reactor vessel is operated at about 850–1050° F., preferably about 900–950° F., and at pressures of about 50 to 1000, preferably about 200 lbs. per square inch. In the case of molybdenum oxide on alumina catalysts it is desirable to maintain a water partial pressure of about 0.1 to 3.0 mol percent in the reaction zone.

The regenerator is operated at essentially the same pressure as the hydroforming reactor vessel and at temperatures of about 1000–1200° F., or low enough to avoid thermal degradation of the catalyst. The average residence time of the catalyst in the reactor is of the order of from about 1 to 4 hours and in the regenerator of from about 3 to 15 minutes. The average residence time of the heat transfer solids or shot in the reaction zone is of the order or from about 3 to 20 minutes and in the regenerator it may be about 3 to 15 minutes, i.e., coextensive with the residence time of the catalyst or may be held for longer or shorter times than the catalyst in the regenerator.

The weight ratio of catalyst to oil introduced into the reactor should ordinarily be about 0.5 to 3.5. Space velocities or the weight in pounds of feed charged per hour per pound of catalyst in the reactor depends upon the age or activity level of the catalyst, the character of the feed stock and the desired octane number of the product. Space velocity for a molybdic oxide on alumina gel catalyst may vary from about 1.5 to about 0.15 w./hr./w.

The invention will be more clearly understood by considering its application to the hydroforming of a 200–350° F., virgin naphtha having a research clear octane number of 45 to 50 to yield a product gasoline of 95 100 research clear octane number. A catalyst consisting of about 10% $MoO_3$ on an activated alumina is used, and the inert heat transfer solids are microspheroidal mullite particles of 800–1400 microns diameter. The system pressure is about 200 lb./sq. in. The reactor dense bed 13 is held at about 900° F., and the catalyst in the regenerator 23 is held at a temperature of about 1125° F. The catalyst is circulated through the system at a rate of about 0.5 lb./lb. of naphtha fed into the reactor, and the inert solids are circulated at a rate of about 5 lb./lb. of naphtha feed. The ratio of inert solids to catalyst is thus about ten to one.

The total recycle gas introduced into the reactor amounts to about 3000 cu. ft./bbl. of naphtha feed. Part or all of this gas is introduced through line 11 to fluidize the solids in the settling section 60 and to control the rate of settling of catalyst in this section. The amount of recycle gas introduced through line 11 is sufficient to provide a velocity in section 60 below the minimum fluidizing velocity of the inert solids particles. This may be in the range of 0.8 to 2.0 ft./sec. The remainder of the recycle gas is introduced along with the naphtha feed through inlet lines 12. The operation of the lower section of the reactor including the settling zone 60 is very important. If the proper conditions for achieving the necessary ratio of inert solids to catalyst in the stream leaving section 60 are not obtained, undesirably large quantities of inert solids will exist in the bottom of the reacton dense bed 13, thus occupying an undesirably large volume of the reactor which should be used for carrying out the hydroforming reaction.

The mixture of inert solids and catalyst in the proper ratio is introduced into stripping section 17. Here the adsorbed and occluded hydrocarbons and hydrogen associated with the catalyst and inert solids are removed by stripping with steam introduced through line 18. This section is preferably baffled to insure thorough contact of the solids with steam. The quantity of steam used is held to the minimum necessary for satisfactory removal of hydrocarbons and hydrogen from the solids in order to minimize the possibility of appreciable quantities of steam entering the main reactor dense bed 13. Essentially all the steam and the vapors stripped from the solids pass through the interior of concentric section 19 and into the disperse phase 14, thus by-passing the main reactor bed 13. The quantity of stripping steam used is about 1.5 lbs./1000 lb. of total solids passing down through stripper 17.

The bulk of the mixture of catalyst and inert solids withdrawn from the bottom of stripper 17 is passed through standpipe 20 and riser line 21 to regenerator 23. The solids are moved through this line 21 by introducing air into line 21 to provide the proper velocity and density in the riser section of line 21. The velocity in this line should be in the range of 10 to 30 ft./sec., and the density about 30 to 15 lb./cu. ft. Only 10–30% of the air necessary for combustion of carbon in the regenerator should be introduced into line 21; the remainder is introduced through lines 55. If additional gas is necessary for transportation of the solids through line 21, recycled regenerator flue gas or other inert gas may be used in addition to the air.

The shot passing down through standpipe 20 contains between 0.5 and 5.0 wt. percent of fine catalyst adhering to the shot. About 0.01–1.0% of this total shot stream passing through standpipe 20 is withdrawn through line 27 and introduced into the lower, small diameter section of attrition vessel 28. Recycle gas or steam is introduced into this lower section of 28 at a rate sufficient to give a velocity of 2–10 ft./sec. in this lower section. This gas is introduced into the attrition vessel from line 30 through nozzles designed to provide a gas velocity equal to about sonic velocity or above. This gas serves to elutriate non-adhering catalyst carried with the shot into the attrition vessel and also to break adhering catalyst fines from the shot particles by attritive action. This attrition occurs both as a result of the relatively high velocity (2–10 ft./sec.) in the small diameter section of the attrition vessel and due to the high degree of turbulence and eddying in the area immediately surrounding the discharge ends of the nozzles operating at around sonic velocity. The catalyst particles removed by simple entrainment of occluded particles and those removed by attrition are entrained into the upper, larger diameter section of attrition vessel 28. The velocity in this section is reduced by the increased cross-sectional area to 0.5–2 ft./sec. At these velocities, essentially all shot particles will fall out of the gas stream and return to the lower section of the vessel. The finer catalyst particles are entrained overhead through line 29 and returned to the upper part of reactor 10.

The rate at which the shot-catalyst mixture is withdrawn through line 27 into attrition vessel 28 is adjusted to give a concentration of catalyst on the shot leaving vessel 28 through standpipe 31 of 0–1.0 wt. percent based on the shot. This concentration is determined by withdrawing samples periodically from sample line 32. The cleaned shot is passed into line 21 where it is carried along with the main shot-catalyst stream from standpipe 20 into regenerator 23.

The foregoing description contains a limited number of embodiments of this invention. It will be understood that this invention is not limited thereto without departing from the scope of this invention.

What is claimed is:

1. In a method of carrying out fluid catalytic processes in which inert heat transfer solids or shot particles are circulated in a reactor-regenerator system with the catalyst, the improvement which comprises preventing the build up of a coating of fine catalyst particles upon the shot particles by withdrawing shot from the circulating system, subjecting the withdrawn shot to an attrition operation which removes adhering catalyst fines and returning the cleaned shot to the circulating system.

2. In a method of carrying out fluid catalytic processes in which inert heat transfer solids or shot particles are circulated in a reactor-regenerator system with the catalyst, the improvement which comprises preventing the build up of a coating of fine catalyst particles upon the shot particles by withdrawing shot from the circulating system, subjecting the withdrawn shot to the attritive action of a high velocity gas stream, thereby breaking off the adherent layer of catalyst fines, separating the catalyst fines from the cleansed shot and returning the cleansed shot to the circulating system.

3. In a method of carrying out fluid catalytic processes in which inert heat transfer solids or shot particles are circulated in a reactor-regenerator system with the catalyst, the improvement which comprises preventing the build up of a coating of fine catalyst particles upon the shot particles by withdrawing shot from the circulating system, transporting the withdrawn shot in a stream of carrier gas and impinging the shot particles at high velocity against a plate, thereby breaking off the adherent layer of catalyst fines, separating the catalyst fines from the cleansed shot and returning the cleansed shot to the circulating system.

4. In a method of carrying out fluid catalytic processes in which inert heat transfer solids or shot particles are circulated in a reactor-regenerator system with the catalyst, the improvement which comprises preventing the build up of a coating of fine catalyst particles upon the shot particles by withdrawing shot from the circulating system, introducing the withdrawn shot into an attrition zone, passing a gas at about sonic or above velocity into the shot in the attrition zone at a rate sufficient to give an upward superficial velocity of 2 to 10 ft. per second in the zone, thereby breaking off the adherent layer of catalyst fines, separating the catalyst fines from the cleansed shot and returning the cleansed shot to the circulating system.

5. The method as defined in claim 4 in which the gas is introduced into the attrition vessel through nozzles designed to give a gas velocity equal at least to aboutسonic velocity thereby imparting a high degree of turbulence and eddying at the discharge end of said nozzles.

References Cited in the file of this patent

UNITED STATES PATENTS

| | | |
|---|---|---|
| 2,393,636 | Johnson | Jan. 29, 1946 |
| 2,423,850 | Peery | July 15, 1947 |
| 2,446,247 | Scheineman | Aug. 3, 1948 |
| 2,651,600 | Taff et al. | Sept. 8, 1953 |
| 2,742,403 | Nicholson et al. | Apr. 17, 1956 |
| 2,763,596 | Feldbauer et al. | Sept. 18, 1956 |